(12) United States Patent
Guo et al.

(10) Patent No.: US 10,242,432 B2
(45) Date of Patent: Mar. 26, 2019

(54) VIDEO DENOISING SYSTEM BASED ON NOISE CORRELATION

(71) Applicant: Institute of Automation Chinese Academy of Sciences, Beijing (CN)

(72) Inventors: Ruoshan Guo, Beijing (CN); Lu Ye, Beijing (CN); Rui Han, Beijing (CN); Yang Luo, Beijing (CN); Renjun Tang, Beijing (CN); Fengli Yan, Beijing (CN); Xiaoli Tang, Beijing (CN)

(73) Assignee: Institute of Automation Chinese Academy of Sciences, Beijing (CN)

( * ) Notice: Subject to any disclaimer, the term of this patent is extended or adjusted under 35 U.S.C. 154(b) by 0 days.

(21) Appl. No.: 15/557,085

(22) PCT Filed: Apr. 16, 2015

(86) PCT No.: PCT/CN2015/076800
§ 371 (c)(1),
(2) Date: Sep. 9, 2017

(87) PCT Pub. No.: WO2016/165116
PCT Pub. Date: Oct. 20, 2016

(65) Prior Publication Data
US 2018/0061015 A1 Mar. 1, 2018

(51) Int. Cl.
*G06T 5/00* (2006.01)
*G06T 5/20* (2006.01)
*H04N 5/21* (2006.01)

(52) U.S. Cl.
CPC ............... *G06T 5/002* (2013.01); *G06T 5/20* (2013.01); *H04N 5/21* (2013.01); *G06T 2207/20182* (2013.01); *G06T 2207/20208* (2013.01)

(58) Field of Classification Search
CPC .... H04N 17/00; H04N 19/176; H04N 19/182; H04N 19/523
(Continued)

(56) References Cited

U.S. PATENT DOCUMENTS 7,023,471 B2 * 4/2006 Balasubrawmanian ...................... H04N 17/00 348/182
7,495,674 B2 * 2/2009 Biagiotti ................ H04N 17/00 345/16

(Continued)

FOREIGN PATENT DOCUMENTS

| CN | 102281386 A | 12/2011 |
|----|-------------|---------|
| CN | 103888638 A | 6/2014 |
| CN | 104780295 A | 7/2015 |

OTHER PUBLICATIONS

PCT/CN2015/076800 International Search Report.

*Primary Examiner* — Yosef Kassa
(74) *Attorney, Agent, or Firm* — Howard IP Law, PLLC; Jeremy Howard (57) ABSTRACT

The present invention discloses a video denoising system based on noise correlation, said system comprises a unit for estimating correlation of noises of adjacent pixels, which receives input of the inter-frame difference and motion probability, and estimates correlation of noises of adjacent pixels according to correlation of inter-frame differences between adjacent pixels in a still region, and outputs a noise correlation coefficient; a maximum filtering weight adjusting unit, which adaptively adjusts the maximum weight for temporal filtering according to the noise correlation coefficient and outputs the maximum weight for temporal filtering; the maximum weight for temporal filtering can control the range of fluctuation of the temporal filtering weight and the difference between the denoising effects for different (Continued)

pixels. The system of the present invention can solve the problem of "speckle" noise occurred when the video noises have adjacent correlation in the conventional temporal denoising system for videos.

13 Claims, 4 Drawing Sheets

(58) Field of Classification Search
USPC .............. 382/194, 195, 205, 206, 274, 275; 348/208.4, 208.13
See application file for complete search history.

(56) References Cited

U.S. PATENT DOCUMENTS

| | | | |
|---|---|---|---|
| 7,792,194 B2* | 9/2010 | Zhong | H04N 19/42 375/240.26 |
| 7,848,408 B2* | 12/2010 | Feng | H04N 19/176 375/240.03 |
| 8,254,462 B2* | 8/2012 | Schoner | H04N 5/142 348/448 |
| 8,294,822 B2* | 10/2012 | Payson | H04N 5/265 348/571 |
| 8,639,053 B2* | 1/2014 | Elton | G06T 3/4053 382/264 |
| 2009/0052775 A1 | 2/2009 | Moon et al. | |

\* cited by examiner

Fig.7

VIDEO DENOISING SYSTEM BASED ON NOISE CORRELATION

TECHNICAL FIELD

The present invention relates to the technical field of video processing, in particular to the technical field of performing temporal noise reduction on videos, such as the technical field of video processing in a digital television chip.

BACKGROUND

Image capturing devices (CMOS, CCD sensor) are usually influenced by noises during imagecapturing, which results in random noise in the videos, so it is necessary to remove the noises by means of video denoising technologies. In addition, with the development of mobile internet and as videos are becoming more and more multi-sourced, various video sources need to be displayed on display terminal devices such as a television, which include not only the conventional digital broadcast videos, but also videos from the Internet or handheld terminals. Multi-sourcing of videos poses new challenges to video denoising systems.

Figure 1:
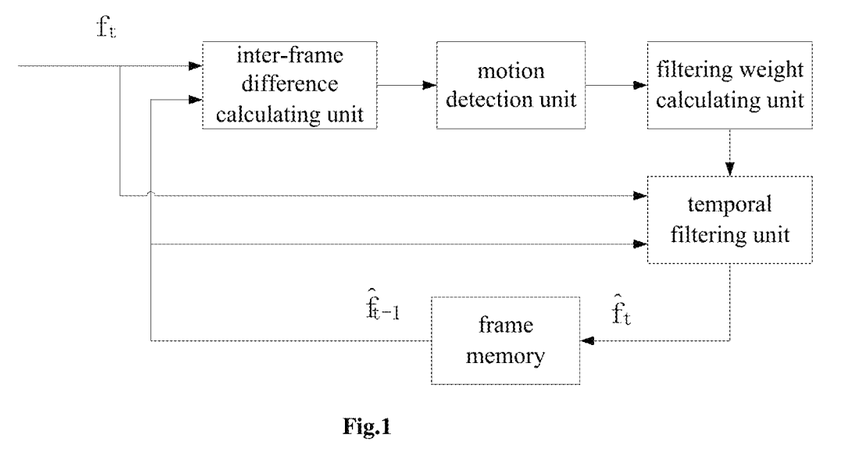
FIG. 1 is a block diagram of a conventional temporal denoising system.

Video noise reduction technology includes spatial noise reduction and temporal noise reduction technologies, wherein the spatial noise reduction technology will usually result in blurring of details, while the temporal noise reduction technology can better protect details, so it is more widely used in the industry. A conventional temporal denoising system for videos is as shown in FIG. 1, wherein an inter-frame difference is calculated by means of a current frame and a previous filtered frame, then the inter-frame difference is compared with a threshold to perform motion detection. Pixels whose inter-frame difference is greater than the threshold are moving pixels, and pixels whose inter-frame difference is smaller than the threshold are still pixels. Then a filtering weight is calculated by means of the result of motion detection, and a weighted filtering is performed on the current frame and the previous filtered frame. If it is a still region, the weight for temporal weighting is larger so as to remove noise, and if it is a motion region, the weight for temporal weighting is smaller, thereby avoiding the occurrence of trailing around a moving object.

The conventional motion detection system compares a local inter-frame difference of each pixel to a threshold so as to obtain a motion probability of the pixel, so no matter how the threshold is selected, two kinds of errors are inevitable, one is that still pixels are erroneously considered as moving pixels, and the other is that moving pixels are erroneously considered as still pixels. Since the motion detection for each pixel is independent, the motion detection results are not consistent in spatial regions, and pixels in a still region are usually erroneously detected as moving. The weight for temporal filtering is determined according to the motion probability, so in the still region, the inconsistent motion detection results will cause inconsistency in the filtering weights, accordingly, the denoising effects are not consistent in the spatial region, namely, noises of most still pixels are removed, but noises of pixels that are erroneously detected as moving are not removed. Noises of the correctly detected pixels in the adjacent area are removed, so the pixels whose noises are not removed are presented in the videos as "impulses" or "speckles".

When the video noises satisfy an independent identically distributed Gaussian white noise distribution, pixels in the still region that have been erroneously detected as moving are usually presented as isolated points in the motion detection result, and by using this characteristic, patent U.S. Pat. No. 7,903,179B2 and patent U.S. Pat. No. 6,061,100 correct said erroneous detection results. For example, U.S. Pat. No. 7,903,179B2 provides a method for "Impulse Pattern Recognition", which can detect the erroneously detected isolated points (Impulse Pattern) so as to remove saidisolated points. U.S. Pat. No. 6,061,100 proposes a method for "Peculiar point removal portion" to remove the isolated points.

A video processing system in a digital television chip usually performs processing in a sequence of denoising, de-interlacing and scaling, and conventional denoising systems are designed under the assumption that the video random noise is an independent identically distributed Gaussian white noise. But actually some video sources (especially video sources from the Internet) have already been subjected to some processing, such as de-interlacing, scaling, filtering, etc., before being input into the television. The noise characteristics of such de-interlaced or scaled video sources no longer have the characteristic of independence, and there is certain correlation between noises of adjacent pixels. In this case, if motion detection is performed according to the threshold comparison method, the still pixels in the still region that have been erroneously detected as moving no longer present in the form of isolated points, but they will be enlarged to connected area composed of multiple pixels, thus the isolated point detection method provided by patent U.S. Pat. No. 7,903,179B2 and patent U.S. Pat. No. 6,061,100 no longer works. On the other hand, when noises of adjacent pixels have certain correlation, the size of the interconnected region formed by pixels in the still region that have been erroneously detected as moving increases as compared to the size when the noises of adjacent pixels are independent, thus the size of "speckle" noise caused by erroneous detection will be larger than the "speckle" noise size when the noises of adjacent pixels are independent, accordingly, more serious effect is caused to the image quality.

In summary, for videos in which noises of adjacent pixels are not independent from each other, the problem of "speckle" noise occurred in the conventional temporal denoising system for videos needs to be solved.

SUMMARY OF THE INVENTION

In order to solve the above technical problem, the present invention proposes a video denoising system based on noise correlation to solve the problem of "speckle" noise occurred in the conventional temporal denoising system for videos.

The video denoising system based on noise correlation provided by the present invention comprises: a frame memory, an inter-frame difference calculating unit, a motion detection unit, a filtering weight calculating unit, a temporal filtering unit, a unit for estimating correlation of noises of adjacent pixels, and a maximum filtering weight adjusting unit; the unit for estimating correlation of noises of adjacent pixels calculates a correlation coefficient $r_h$ of horizontally adjacent pixels, a correlation coefficient $r_v$ of vertically adjacent pixels, a correlation coefficient $r_d$ of diagonally adjacent pixels according to the inter-frame difference d output from the inter-frame difference calculating unit and a motion probability m of each pixel output from the motion detection unit, and outputs a noise correlation coefficient r based on rh, rv and rd.

the maximum filtering weight adjusting unit calculates and outputs a maximum weight Mw for performing temporal filtering according to the noise correlation coefficient r;

the filtering weight calculating unit calculates and outputs a filtering weight w for performing temporal filtering according to the motion probability m of each pixel and the maximum weight Mw for filtering.

By means of the unit for estimating correlation of noises of adjacent pixels, the present invention can estimate the noise correlation of adjacent pixels of a video and can use the noise correlation to adjust the maximum weight for temporal filtering, thereby controlling the range of fluctuation of the filtering weight and achieving the following advantageous effects:

(1) noise correlation estimation can detect videos in which "speckle" noises will readily occur;
(2) for videos in which pixel noises do not have correlation and "speckle" noises will not readily occur, a larger maximum filtering weight is adaptively chosen so as to achieve good denoising effect;
(3) for videos in which noises of adjacent pixels have certain correlation and "speckle" noises will readily occur, a smaller maximum filtering weight is adaptively chosen so as to control the range of fluctuation of the filtering weight, thereby reducing the filtering weight difference between the erroneously detected pixel and the correctly detected pixel and reducing the filtering denoising effect difference between the erroneously detected pixel and the correctly detected pixel, and avoiding occurrence of "speckle" noises.

DETAILED DESCRIPTION

In order to make the object, technical solutions and advantages of the present invention clearer, with reference to the drawings and in conjunction with the specific embodiments, the cause of speckle noises as well as the noise correlation are analyzed first in the text below, and then embodiments of the present invention are described in further detail.

I. Analysis of the Cause of Speckle Noises as Well as the Noise Correlation

1. Cause of Speckle Noises

A common motion detection method compares a local inter-frame difference of each pixel to a threshold so as to obtain the motion probability of the pixel, so no matter how the threshold is selected, two kinds of errors are inevitable, one is that still pixels are erroneously considered as moving pixels, and the other is that moving pixels are erroneously considered as still pixels. Since the motion detection for each pixel is independent, the motion detection results are not consistent in spatial regions, and pixels in a still region are usually erroneously detected as moving. The weight for temporal filtering is determined according to the motion probability, so in the still region, the inconsistency in motion detection results will cause inconsistency in the filtering weights, accordingly, the denoising effects are not consistent in the spatial region, that is, noises of most still pixels are removed, but noises of pixels that are erroneously detected as moving are not removed. Noises of the correctly detected pixels in the adjacent area are removed, so the pixels whose noises are not removed present themselves in the videos as "impulse" noises or "speckle" noises.

2. Analysis on Influence to the Size of "Speckle" Noise by Noise Correlation

When the video noise is Gaussian white noise and noises at different positions satisfy an independent identically distributed distribution, suppose that in a still region, the image at time t of the video is $g_t$, the image at time t−1 is $g_{t-1}$, the gray scale value of the still region is B, the noise is n, which is independent identically distributed zero-mean Gaussian white noise, and the noise variance is $\sigma_g^2$, i.e. n~$N(0,\sigma_g^2)$ $$g_{t-1}(i,j)=B+n_{t-1}(i,j) \quad (1)$$

$$g_t(i,j)=B+n_t(i,j) \quad (2)$$

$$d(i,j)=g_t(i,j)-g_{t-1}(i,j) \quad (3)$$

$$d(i,j)\sim N(0,\sigma_d^2), \sigma_d^2=2\sigma_g^2 \quad (4)$$

Inter-frame difference d(i,j) complies with an independent identically distributed zero-mean Gaussian distribution, suppose that the motion detection is performed in the following way, then the motion probability m(i,j) at position (i,j) is:

$$m(i,j) = \begin{cases} 1 & \text{if } |d(i,j)| < 2\sigma_d \\ 0 & \text{if } |d(i,j)| >= 2\sigma_d \end{cases} \quad (5)$$

Suppose that the probability of the pixel at position (i,j) in the still region being erroneously detected as a moving pixel is $P_s$, then $$P_s = P(d(i,j) > 2\sigma_d), d(i,j) \sim N(0,\sigma_d) \quad (6)$$
$$= 0.05$$

Namely, the probability of a still pixel being erroneously detected as a moving pixel is 0.05.

Suppose that the probability of two adjacent still pixels being erroneously detected as moving pixels simultaneously is $P_{ss}$, then since the noises of the two adjacent pixels are independent from each other, $$P_{ss} = P(d(i,j) > 2\sigma_d, d(i,j+1) > 2\sigma_d) \quad (7)$$
$$= P(d(i,j) > 2\sigma_d) * P(d(i,j+1) > 2\sigma_d)$$
$$= 0.05 * 0.05 = 0.0025$$

Namely, the probability of two adjacent pixels being erroneously detected as moving pixels simultaneously is only 0.0025. Therefore, when the noises of adjacent pixels are independent identically distributed, the erroneously detected pixel points mostly present in the form of isolated points.

Suppose that a video has already been subjected to processing such as de-interlacing, scaling, filtering, etc. before being inputting into a video denoising system, then the video noises of adjacent pixels no longer have the characteristic of independent identically distribution, and only the mean filtering is used as an example herein for illustration.

Suppose that a k×1 mean filtering is performed on each frame of image in the video, then the noise distribution will be $$n \sim N\left(0, \frac{\sigma_g^2}{K}\right), d(i, j) \sim N(0, \sigma_d^2), \sigma_d^2 = \frac{2\sigma_g^2}{K},$$

noise n and inter-difference d of adjacent pixels are no longer independent from each other. Suppose that the inter-frame differences d(i,j) and d(i, j+1) of horizontally adjacent pixels comply with a two-dimensional Gaussian joint distribution, i.e. $(d(i,j),d(i,j+1)) \sim N(0,0,\sigma_d^2,\sigma_d^2,\rho(i,j))$, then the correlation coefficient is $\rho(i,j)$. When k=3, there is the following equation (8):)

$$\rho(i,j) = \text{corr}(d'(i,j), d'(i,j+1)) = \frac{2}{3} \quad (8)$$

It can be seen that after filtering the image, the correlation of noises of adjacent pixels is no longer 0.

Motion detection is still performed on the video according to equation (5). At this time, the probability of a pixel in the still region being erroneously detected as a moving pixel is as shown by equation (6), namely, in the cases of noises of adjacent pixels being independent from each other and being not independent from each other, the probabilities of a single pixel being erroneously detected are the same.

The probability of two adjacent still pixels being erroneously detected as moving pixels simultaneously is $P_{ss}$ $$P_{ss} = P(d(i,j) > 2\sigma_d, d(i,j+1) > 2\sigma_d), (d(i,j), d(i,j+1)) \sim N(0,0, \sigma_d, \sigma_d, \rho) \quad (9)$$

Figure 2:
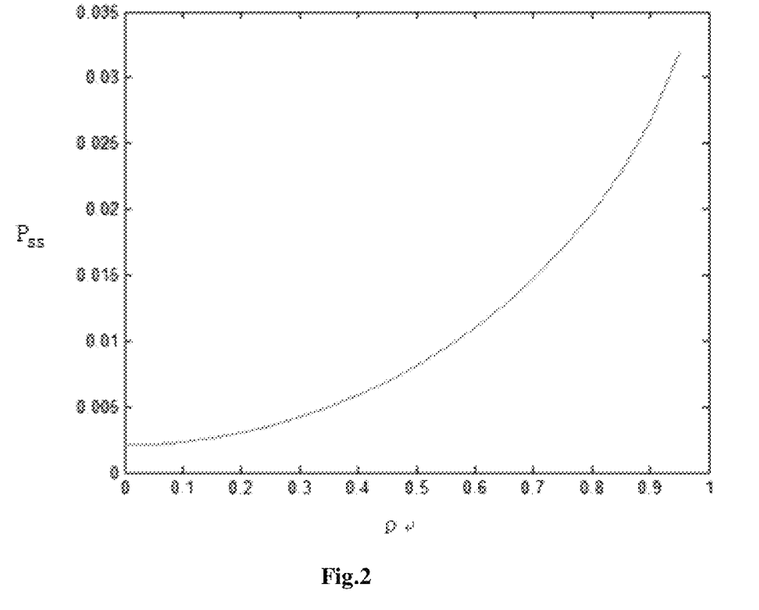
FIG. 2 is a schematic drawing of a curve for the relation between a probability $P_{ss}$ of two adjacent pixels being erroneously detected simultaneously and a correlation ρ.

By calculating equation (9), a curve as shown in FIG. 2 can be obtained.

It can be seen from FIG. 2 that the probability $P_{ss}$ of two adjacent pixels being erroneously detected simultaneously increases with the increase in the correlation of noises of adjacent pixels, so when there is correlation between noises of adjacent pixels, erroneous detection of multiple adjacent pixels is more likely to occur, and the correspondingly formed "speckle" noise size is larger. These will bring about two adverse effects, one is that due to the large size, it cannot be detected and removed by the conventional isolated point detection method (e.g. patent U.S. Pat. No. 7,903,179B2 and patent U.S. Pat. No. 6,061,100), the other is that since the "speckle" size is larger, it is even worse in visual effect than the small size "speckle".

II. System of the Present Embodiment

Noise correlation will affect the size of speckle noise, so the present invention estimates correlation of noises of adjacent pixels to detect videos in which large "speckle" noise will readily occur, and adjusts the maximum weight for temporal filtering for said videos so as to control the range of fluctuation of the filtering weight, thereby controlling the denoising effects for the pixels on the "speckle" and the pixels of adjacent area around the speckle so as to make the denoising difference less obvious and to avoid occurrence of "speckle" noise.

Figure 3:
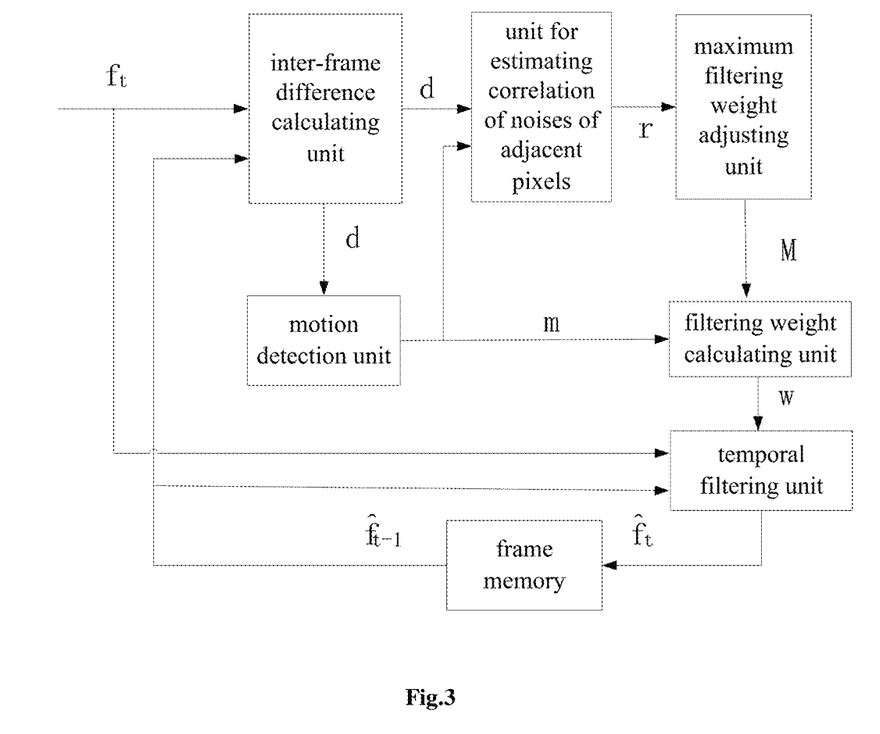
FIG. 3 is a block diagram of a temporal denoising system for videos based on noise correlation according to the present invention.

As shown in FIG. 3, a video denoising system based on noise correlation in the present embodiment comprises: an inter-frame difference calculating unit, a motion detection unit, a unit for estimating correlation of noises of adjacent pixels, a maximum filtering weight adjusting unit, a filtering weight calculating unit, a temporal filtering unit, and a frame memory.

The inter-frame difference calculating unit is configured for calculating an inter-frame difference d between a current frame of the video and a previous filtered frame in the frame memory; the motion detection unit is configured for performing motion detection based on the inter-frame difference to output a motion probability m of each pixel; the unit for estimating noise correlation of adjacent pixels calculates a noise correlation coefficient $r_h$ of horizontally adjacent pixels, a noise correlation coefficient $r_v$ of vertically adjacent pixels, a noise correlation coefficient $r_d$ of diagonally adjacent pixels according to an inter-frame difference d output from the inter-frame difference calculating unit and a motion probability m of each pixel output from the motion detection unit, and outputs a noise correlation coefficient r based on rh, rv and rd; the maximum filtering weight adjusting unit adjusts the maximum weight Mw for filtering according to the noise correlation coefficient r, and a higher noise correlation means a smaller maximum filtering weight; the filtering weight calculating unit calculates a filtering weight w for performing temporal filtering for each pixel according to the motion probability m of each pixel and the maximum weight Mw for filtering; the temporal filtering unit receives input of a current frame of the video and a previous filtered frame in the frame memory and input of the filtering weight w to perform temporal filtering, and outputs the filtered frame; the frame memory is configured for storing the filtered frame obtained by the temporal filtering unit.

The inter-frame difference calculating unit is configured for calculating an inter-frame difference between a current frame of the video and a previous filtered frame in the frame memory, and it receives input of the current frame $f_t$ the video and the previous filtered frame $f'_{t-1}$ in the frame memory, and outputs an inter-frame difference d.

Figure 4:
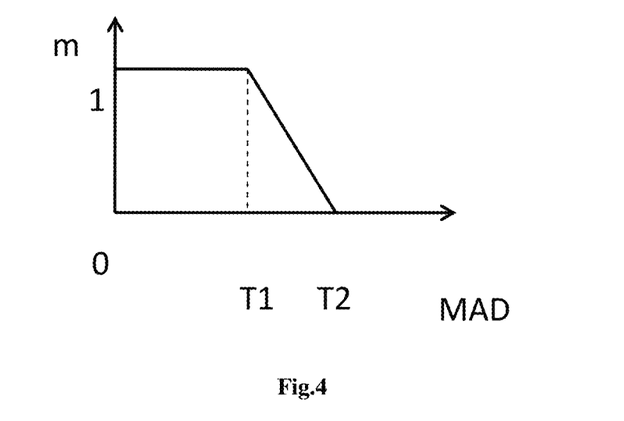
FIG. 4 is a schematic drawing of a motion detection curve.

The motion detection unit calculates a local MAD (Mean Absolute Difference) feature of each pixel according to the input inter-frame difference d, and performs motion detection according to the curve as shown in FIG. 4 to output a motion probability m of each pixel, which can be calculated by equation (10). Wherein, T1 and T2 are soft thresholds for performing motion detection, and T2>T1; in this embodiment, T1=1.5*σ, T2=3*σ, σ represents the noise level of the video.

$$m(i, j) = \begin{cases} 1 & \text{if } MAD(i, j) \leq T1 \\ 0 & \text{if } MAD(i, j) \geq T2 \\ * \frac{T2 - MAD(i, j)}{T2 - T1} & \text{else} \end{cases} \quad (10)$$

Figure 5A:
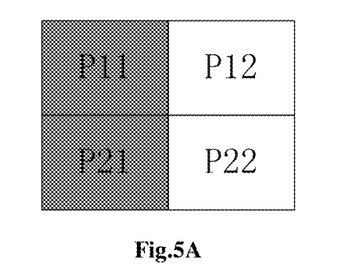
FIG. 5A is a schematic drawing of a relationship of vertical adjacency between pixels.
Figure 5B:
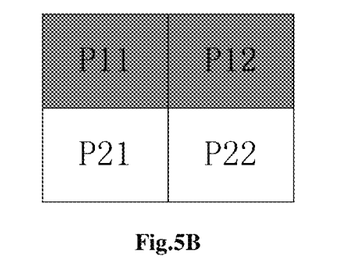
FIG. 5B is a schematic drawing of a relationship of horizontal adjacency between pixels.
Figure 5C:
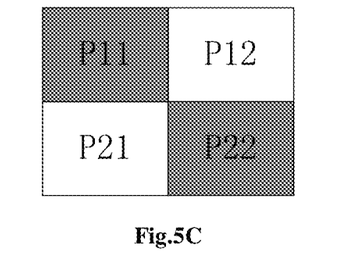
FIG. 5C is a schematic drawing of a relationship of diagonally adjacency between pixels.

The unit for estimating noise correlation of adjacent pixels receives input of the inter-frame difference d and the motion probability m, and estimates noise correlation between adjacent pixels. The inter-frame difference of still pixels reflect the noise, while the inter-frame difference of moving pixels includes both the influence of noise and the influence of movement, so in order to estimate the noise correlation of adjacent pixels, only the inter-frame difference of still pixels should be used. In this embodiment, correlation of noises of vertically adjacent pixels, horizontally adjacent pixels and diagonally adjacent pixels are estimated, and the adjacency relations between the pixels are as shown by the gray pixels in FIGS. 5A, 5B and 5C.

The inter-frame difference of the pixel at (i,j) is represented by d(i,j). The motion probability of the pixel at (i,j) is represented by m(i,j). The width and height of each frame of image of the video is M and N, respectively. The calculation formula for estimating the noise correlation $r_h$ of horizontally adjacent pixels is as shown by equation (11).

$$r_h = \frac{\sum_{i=0}^{i<M}\sum_{j=0}^{j<N-1} d(i,j)*d(i,j+1)*m(i,j)*m(i,j+1)}{\sum_{i=0}^{i<M}\sum_{j=0}^{j<N-1} d(i,j)*d(i,j)*m(i,j)*m(i,j+1)} \quad (11)$$

The calculation formula for estimating the noise correlation $r_v$ of vertically adjacent pixels is as shown by equation (12).

$$r_v = \frac{\sum_{i=0}^{i<M}\sum_{j=0}^{j<N} d(i,j)*d(i+1,j)*m(i,j)*m(i+1,j)}{\sum_{i=0}^{i<M}\sum_{j=0}^{j<N-1} d(i,j)*d(i,j)*m(i,j)*m(i+1,j)} \quad (12)$$

The calculation formula for estimating the noise correlation $r_d$ of diagonally adjacent pixels is as shown by equation (13).

$$r_d = \frac{\sum_{i=0}^{i<M}\sum_{j=0}^{j<N-1} d(i,j)*d(i+1,j+1)*m(i,j)*m(i+1,j+1)}{\sum_{i=0}^{i<M}\sum_{j=0}^{j<N-1} d(i,j)*d(i,j)*m(i,j)*m(i+1,j)} \quad (13)$$

The final output r of the noise correlation estimating unit may be a linear combination of the correlations of the three adjacent domain, which is as shown by equation (14)

$$r = c_h*r_h + c_v*r_v + c_d*r_d \quad (14)$$

wherein, $c_h$, $c_v$, $c_d$ are combination coefficients.

The final output r of the noise correlation estimating unit may also be the maximum value of the three adjacent domain correlations, as shown by equation (15), which can also meet the need of this embodiment.

$$r = \max(r_h, r_v, r_d) \quad (15)$$

Figure 6:
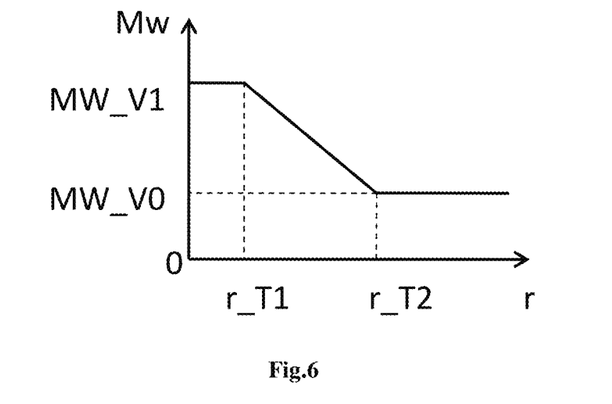
FIG. 6 is a curve of maximum weight adjustment.

The maximum filtering weight adjusting unit adjusts the maximum weight Mw for performing temporal filtering according to the noise correlation, and the adjusting curve is as shown in FIG. 6, wherein the horizontal axis r is the noise correlation, and the vertical axis Mw is the output maximum filtering weight Mw.

The method of calculation includes: setting two soft thresholds r_T1 and r_T2 for the noise correlation r, wherein r_T1<r_T2; setting two thresholds MW_V1 and MW_V0 for the maximum weight Mw, wherein MW_V0<MW_V1; when r≤r_T1, the maximum weight Mw is MW_V1, when r_T1<r<r_T2, the maximum weight Mw monotonically decreases from MW_V1 to MW_V0 as the noise correlation r increases, when r_T2≤r, the maximum weight Mw is MW_V0.

In this embodiment, r_T1=0.05, r_T2=0.2, MW_V1=8, MW_V1=2.

Figure 7:
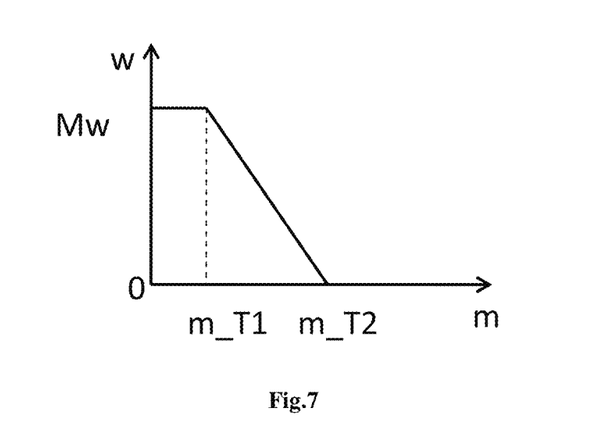
FIG. 7 is a curve of calculation of the weight for temporal filtering.

The filtering weight calculating unit calculates the filtering weight for performing temporal filtering for each pixel according to the motion probability m and the maximum filtering weight Mw of each pixel, and the curve for weight calculation is as shown in FIG. 7, and the calculation formula is as shown by (16)

$$w(i,j) = \begin{cases} M_w & \text{if } m(i,j) < m\_T1 \\ 0 & \text{if } m(i,j) > m\_T2 \\ m(i,j)*\frac{M_w}{m\_T2 - m\_T1} & \text{else} \end{cases} \quad (16)$$

The temporal filtering unit receives an input of the filtering weight w, and the current frame $f_t$ as well as the previous filtered frame $\hat{f}_{t-1}$ in the frame memory to performed weighted filtering to obtain the present filtered frame $\hat{f}_t$, and the filtered value for the pixel at (i,j) is as shown by equation (17)

$$\hat{f}_t(i,j) = \frac{w(i,j)*\hat{f}_{t-1}(i,j) + f_t(i,j)}{1 + w(i,j)} \quad (17)$$

The above are merely specific embodiments of the present invention, but the protection scope of the present invention is not limited to this. Any changes or substitutions that can are conceivable by a person skilled in the art shall fall within the scope of the present invention, so the protection scope of the present invention is based on the protection scope of the claims.

What is claimed is:

1. A video denoising system based on noise correlation, which comprises: a frame memory, an inter-frame difference calculating unit, a motion detection unit, a filtering weight calculating unit, and a temporal filtering unit, characterized in that said system further comprises a unit for estimating correlation of noises of adjacent pixels, and a maximum filtering weight adjusting unit;

the unit for estimating correlation of noises of adjacent pixels calculates a noise correlation coefficient $r_h$ of horizontally adjacent pixels, a noise correlation coefficient $r_v$ of vertically adjacent pixels, a noise correlation coefficient $r_d$ of diagonally adjacent pixels according to an inter-frame difference d output from the inter-frame difference calculating unit and a motion probability m of each pixel output from the motion detection unit, and outputs the maximum value of $r_h$, $r_v$ and $r_d$ as a noise correlation coefficient r;

the maximum filtering weight adjusting unit calculates and outputs a maximum weight Mw for performing temporal filtering according to the noise correlation coefficient r;

the filtering weight calculating unit calculates and outputs a filtering weight w for performing temporal filtering according to the motion probability m of each pixel and the maximum weight Mw for filtering.

2. The video denoising system based on noise correlation as claimed in claim 1, characterized in that the unit for estimating correlation of noises of adjacent pixels calculates a noise correlation coefficient r by the equation of:

wherein $c_h$, $c_v$, $c_d$ are combination coefficients, $r_h$ is noise correlation coefficient of horizontally adjacent pixels, $r_v$ is a noise correlation coefficient of vertically adjacent pixels, $r_d$ is a noise correlation coefficient of diagonally adjacent pixels.

3. The video denoising system based on noise correlation as claimed in claim 1, characterized in that the unit for estimating correlation of noises of adjacent pixels calculates a noise correlation coefficient r by the equation of:

$$r = \max(r_h, r_v, r_d)$$

wherein $r_h$ is a noise correlation coefficient of horizontally adjacent pixels, $r_v$ is a noise correlation coefficient of vertically adjacent pixels, $r_d$ is a noise correlation coefficient of diagonally adjacent pixels.

4. The video denoising system based on noise correlation as claimed in claim 1, characterized in that the correlation coefficient $r_h$ of horizontally adjacent pixels, the correlation coefficient $r_v$ of vertically adjacent pixels, the correlation coefficient $r_d$ of diagonally adjacent pixels are calculated by the following equations:

$$r_h = \frac{\sum_{i=0}^{i<M}\sum_{j=0}^{j<N-1} d(i,j)*d(i,j+1)*m(i,j)*m(i,j+1)}{\sum_{i=0}^{i<M}\sum_{j=0}^{j<N-1} d(i,j)*d(i,j)*m(i,j)*m(i,j+1)}$$

$$r_v = \frac{\sum_{i=0}^{i<M}\sum_{j=0}^{j<N} d(i,j)*d(i+1,j)*m(i,j)*m(i+1,j)}{\sum_{i=0}^{i<M}\sum_{j=0}^{j<N-1} d(i,j)*d(i,j)*m(i,j)*m(i+1,j)}$$

$$r_d = \frac{\sum_{i=0}^{i<M}\sum_{j=0}^{j<N-1} d(i,j)*d(i+1,j+1)*m(i,j)*m(i+1,j+1)}{\sum_{i=0}^{i<M}\sum_{j=0}^{j<N-1} d(i,j)*d(i,j)*m(i,j)*m(i+1,j)}$$

wherein, d(i,j) is the inter-frame difference of the pixel at (i,j), m(i,j) is the motion probability of the pixel at (i,j), M and N are width and height of each frame of image of the video, respectively.

5. The video denoising system based on noise correlation as claimed in claim 4, characterized in that a method for the maximum filtering weight adjusting unit to calculate the maximum weight Mw for filtering is as follows:

setting two thresholds r_T1 and r_T2 for the noise correlation r, wherein r_T1<r_T2; setting two thresholds MW_V1 and MW_V0 for the maximum weight Mw for filtering, wherein MW_V0<MW_V1;

when r≤r_T1, the maximum weight for filtering Mw is MW_V1, when r_T1<r≤r_T2, the maximum weight for filtering Mw monotonically decreases from MW_V1 to MW_V0 as the noise correlation r increases, when r_T2≤r, the maximum weight for filtering Mw is MW_V0.

6. The video denoising system based on noise correlation as claimed in claim 5, the motion detection unit calculates the motion probability m of the pixel by the equation of:

$$m(i,j) = \begin{cases} 1 & \text{if } MAD(i,j) \leq T1 \\ 0 & \text{if } MAD(i,j) \geq T2 \\ * \frac{T2 - MAD(i,j)}{T2 - T1} & \text{else} \end{cases}$$

wherein, MAD is a local Mean Absolute Difference feature of the pixel calculated according to the input inter-frame difference, T1 and T2 are soft thresholds for performing motion detection, and T2>T1.

7. The video denoising system based on noise correlation as claimed in claim 6, characterized in that said filtering weight calculating unit calculates the filtering weight w for temporal filtering by the equation:

$$w(i,j) = \begin{cases} M_w & \text{if } m(i,j) < m\_T1 \\ 0 & \text{if } m(i,j) > m\_T2 \\ m(i,j) * \frac{M_w}{m\_T2 - m\_T1} & \text{else} \end{cases}$$

wherein m_T1 and m_T2 are thresholds for the motion probability, $M_w$ is the maximum filtering weight, and m is the motion probability of the pixel.

8. The video denoising system based on noise correlation as claimed in claim 7, characterized in that the temporal filtering unit calculates the current filtered frame $f\hat{\,}_t(i,j)$ by the equation:

$$f_t^{\wedge}(i,j) = \frac{w(i,j) * f_{t-1}^{\wedge}(i,j) + f_t(i,j)}{1 + w(i,j)}$$

wherein, $f_t$ is the current frame, $f\hat{\,}_{t-1}$ is the previous filtered frame in the frame memory, and W is the filtering weight for temporal filtering of the pixel.

9. The video denoising system based on noise correlation as claimed in claim 2, characterized in that the noise correlation coefficient $r_h$ of horizontally adjacent pixels, the noise correlation coefficient $r_v$ of vertically adjacent pixels, the noise correlation coefficient $r_d$ of diagonally adjacent pixels are calculated by the following equations:

$$r_h = \frac{\sum_{i=0}^{i<M}\sum_{j=0}^{j<N-1} d(i,j)*d(i,j+1)*m(i,j)*m(i,j+1)}{\sum_{i=0}^{i<M}\sum_{j=0}^{j<N-1} d(i,j)*d(i,j)*m(i,j)*m(i,j+1)}$$

$$r_v = \frac{\sum_{i=0}^{i<M}\sum_{j=0}^{j<N} d(i,j)*d(i+1,j)*m(i,j)*m(i+1,j)}{\sum_{i=0}^{i<M}\sum_{j=0}^{j<N-1} d(i,j)*d(i,j)*m(i,j)*m(i+1,j)}$$

$$r_d = \frac{\sum_{i=0}^{i<M}\sum_{j=0}^{j<N-1} d(i,j)*d(i+1,j+1)*m(i,j)*m(i+1,j+1)}{\sum_{i=0}^{i<M}\sum_{j=0}^{j<N-1} d(i,j)*d(i,j)*m(i,j)*m(i+1,j)}$$

wherein, d(i,j) is the inter-frame difference of the pixel at (i,j), m(i,j) is the motion probability of the pixel at (i,j), M and N are width and height of each frame of image of the video, respectively.

10. The video denoising system based on noise correlation as claimed in claim 9, characterized in that a method for the maximum filtering weight adjusting unit to calculate the maximum weight Mw for filtering is as follows:

setting two thresholds r_T1 and r_T2 for the noise correlation r, wherein r_T1<r_T2; setting two thresholds MW_V1 and MW_V0 for the maximum weight Mw for filtering, wherein MW_V0<MW_V1;

when r≤r_T1, the maximum weight for filtering Mw is MW_V1, when r_T1<r<r_T2, the maximum weight for filtering Mw monotonically decreases from MW_V1 to MW_V0 as the reliability r increases, when r_T2≤r, the maximum weight for filtering Mw is MW_V0.

11. The video denoising system based on noise correlation as claimed in claim 10, the motion detection unit calculates the motion probability m of the pixel by the equation of:

$$m(i, j) = \begin{cases} 1 & \text{if } MAD(i, j) \le T1 \\ 0 & \text{if } MAD(i, j) \ge T2 \\ * \dfrac{T2 - MAD(i, j)}{T2 - T1} & \text{else} \end{cases}$$

wherein, MAD is a local Mean Absolute Difference characteristic of the pixel calculated according to the input inter-frame difference, T1 and T2 are soft thresholds for performing motion detection, and T2>T1.

12. The video denoising system based on noise correlation as claimed in claim 11, characterized in that said filtering weight calculating unit calculates the filtering weight w for temporal filtering by the equation:

$$w(i, j) = \begin{cases} M_w & \text{if } m(i, j) < m\_T1 \\ 0 & \text{if } m(i, j) > m\_T2 \\ m(i, j) * \dfrac{M_w}{m\_T2 - m\_T1} & \text{else} \end{cases}$$

wherein m_T1 and m_T2 are thresholds for the motion probability, $M_w$ is the maximum filtering weight, and m is the motion probability of the pixel.

13. The video denoising system based on noise correlation as claimed in claim 12, characterized in that the temporal filtering unit calculates the present filtered frame f^_t(i,j) by the equation:

$$\hat{f_t}(i, j) = \frac{w(i, j) * \hat{f}_{t-1}(i, j) + f_t(i, j)}{1 + w(i, j)}$$

wherein, $f_t$ is the current frame, $\hat{f}_{t-1}$ is the previous filtered frame in the frame memory, and W is the filtering weight for temporal filtering of the pixel.

* * * * *

UNITED STATES PATENT AND TRADEMARK OFFICE
CERTIFICATE OF CORRECTION

PATENT NO. : 10,242,432 B2  
APPLICATION NO. : 15/557085  
DATED : March 26, 2019  
INVENTOR(S) : Ruoshan Guo et al.

Page 1 of 1

It is certified that error appears in the above-identified patent and that said Letters Patent is hereby corrected as shown below:

On the Title Page

Item (73) should read:  
(73) Assignee: Beijing Smartlogic Technology Ltd., Yancun Town (CN)

Signed and Sealed this  
Fifteenth Day of October, 2019

Andrei Iancu  
*Director of the United States Patent and Trademark Office*